United States Patent
Irifune et al.

(10) Patent No.: US 8,779,074 B2
(45) Date of Patent: Jul. 15, 2014

(54) ADDITION CURE SILICONE EMULSION COMPOSITION AND RELEASE FILM

(71) Applicant: Shin-Etsu Chemical Co., Ltd., Tokyo (JP)

(72) Inventors: Shinji Irifune, Annaka (JP); Tsutomu Nakajima, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/911,423

(22) Filed: Jun. 6, 2013

(65) Prior Publication Data

US 2013/0330562 A1  Dec. 12, 2013

(30) Foreign Application Priority Data

Jun. 7, 2012  (JP) ................. 2012-129935

(51) Int. Cl.
 *C08J 3/03*  (2006.01)
 *C08L 83/04*  (2006.01)

(52) U.S. Cl.
 USPC .............. 525/477; 516/53; 516/76; 524/366; 524/375; 524/376; 524/378; 525/478; 528/15; 528/31; 528/32

(58) Field of Classification Search
 None
 See application file for complete search history.

(56) References Cited

U.S. PATENT DOCUMENTS

| | | | |
|---|---|---|---|
| 3,900,617 A | 8/1975 | Grenoble | |
| 4,663,397 A * | 5/1987 | Morita et al. | 525/398 |
| 5,095,067 A | 3/1992 | Hara et al. | |
| 5,104,927 A | 4/1992 | Hara et al. | |
| 5,500,148 A | 3/1996 | Ohba et al. | |
| 5,968,660 A * | 10/1999 | Armstrong et al. | 428/447 |
| 6,425,600 B1 * | 7/2002 | Fujiki et al. | 280/728.1 |
| 6,491,980 B1 * | 12/2002 | Muller et al. | 427/387 |
| 6,794,444 B2 | 9/2004 | Yamamoto et al. | |
| 2010/0305258 A1 | 12/2010 | Irifune et al. | |

FOREIGN PATENT DOCUMENTS

| | | |
|---|---|---|
| EP | 1 323 796 B1 | 3/2006 |
| GB | 1 599 209 | 9/1981 |
| JP | 54-52160 A | 4/1979 |
| JP | 57-53143 B2 | 11/1982 |
| JP | 63-314275 A | 12/1988 |
| JP | 6-57144 A | 3/1994 |
| JP | 11-222557 A | 8/1999 |
| JP | 3824072 B2 | 9/2006 |

OTHER PUBLICATIONS

Extended European Search Report issued Sep. 20, 2013, in European Patent Application No. 13170943.8.

* cited by examiner

*Primary Examiner* — Marc Zimmer
(74) *Attorney, Agent, or Firm* — Birch, Stewart, Kolasch & Birch, LLP

(57) ABSTRACT

A silicone emulsion composition is provided comprising organopolysiloxane, organohydrogenpolysiloxane, surfactant, and water. Two organopolysiloxanes of different type are blended, whereby a cured silicone coating is improved to be fully adherent to plastic film and lightly peelable from pressure-sensitive adhesive. By limiting the SiH content of organohydrogenpolysiloxane, the composition is improved in shelf stability. A specific surfactant is used to control the size of emulsion particles so as to improve wettability to plastic film.

7 Claims, No Drawings

ADDITION CURE SILICONE EMULSION COMPOSITION AND RELEASE FILM

CROSS-REFERENCE TO RELATED APPLICATION

This non-provisional application claims priority under 35 U.S.C. §119(a) on Patent Application No. 2012-129935 filed in Japan on Jun. 7, 2012, the entire contents of which are hereby incorporated by reference.

TECHNICAL FIELD

This invention relates to an addition cure silicone emulsion composition suitable for forming a coating meeting both the requirements of peeling from pressure-sensitive adhesive and adhesion to plastic film substrate, and a release film obtained by coating and curing the composition to a plastic film substrate.

BACKGROUND ART

In the release paper art, there are known a variety of silicone release compositions for use in preventing any sticking or adhesion between substrates of paper, plastics or the like and pressure-sensitive adhesives (PSAs). Of these, solvent type silicone compositions have been widely used because of release properties and relatively wide substrate selectivity.

However, from the standpoints of environmental pollution, safety and health, it now becomes necessary to take countermeasures to reduce the amount of solvent used or to recover the solvent to stop discharge to the exterior. One effective means of reducing the amount of solvent used is use of solventless silicone compositions. In order to apply the solventless silicone compositions to paper, laminate paper or plastic film substrates uniformly to a submicron thickness, an expensive applicator and a sophisticated technique are necessary. In general, most manufacturers hesitate to accept the change from the solvent type silicone to the solventless type silicone.

Another effective means of reducing the amount of solvent used is use of emulsion type silicone compositions. Silicone compositions of emulsion type are known and used in the art. For example, Patent Document 1 discloses a composition obtained by mixing an emulsion composed of an organovinylpolysiloxane, a platinum compound, an emulsifying agent and water with another emulsion composed of an organohydrogenpolysiloxane, an emulsifying agent and water. Also known are a silicone composition produced by emulsion polymerization (see Patent Document 2), and a composition obtained by emulsifying an organovinylsiloxane and an organohydrogenpolysiloxane with a specific emulsifying agent and mixing the emulsion with an emulsion of a platinum compound (see Patent Document 3).

Since these emulsion type silicone compositions can be diluted with water to any desired concentration, an expensive applicator and a sophisticated technique for thin film coating are not necessary as opposed to the solventless type, and their ease of application is approximate to the solvent type.

However, emulsion type silicone compositions have not enjoyed widespread use because of drawbacks associated with water as the dispersing medium. One drawback is that high temperature cure is necessary due to the latent heat of water for evaporation, indicating poor curability as compared with the solvent and solventless types. Another drawback is that wettability and adhesion to substrates are poor because of the surface tension of water. These drawbacks become serious especially with plastic film substrates. They account for the reason why few emulsion compositions have been utilized.

A number of proposals have been made to solve these problems. For example, Patent Document 4 uses an organopolysiloxane having alkenyl radicals at molecular ends, and Patent Document 5 discloses blending of an emulsion of a non-silicone polymer. Most of these compositions are intended to apply to paper substrates, and fail to achieve satisfactory adhesion when applied to plastic film substrates. Under the circumstances, the inventors proposed in Patent Document 6 a silicone emulsion composition based on an organopolysiloxane wherein trifunctional siloxane units (T units) account for 35 to 60 mol % of the entire siloxane units and alkenyl groups account for at least 20 mol % of the entire organic groups, the composition being fully adherent to various plastic film substrates. Although this composition is fully adherent to various plastic film substrates, it must contain at least 50% by weight of the organopolysiloxane containing much trifunctional siloxane units and alkenyl groups, as adhesion-providing component. It is thus difficult to design this composition so as to be lightly or easily peelable from acrylic PSAs.

Recently, release films based on plastic film substrates are often used in the optical and electric/electronic part applications. There is an increasing tendency for these release films to require light removal from PSA. None of currently available silicone emulsion compositions for plastic film substrates meet the current demand.

In general, addition cure silicone emulsion compositions containing organohydrogenpolysiloxane have one common drawback that since the organohydrogenpolysiloxane is in contact with water and surfactant in the emulsion, it often undergoes dehydrogenation during shelf storage or in treating bath. Once dehydrogenation reaction occurs, the amount of active organohydrogenpolysiloxane in the composition is reduced, causing a reduction of cure and adhesion. Particularly when plastic film is used as the substrate, the degradation of organohydrogenpolysiloxane as crosslinker by dehydrogenation largely affects the adhesion of cured silicone coating to the substrate. Therefore, when the addition cure silicone composition is formulated as emulsion, it is desired that the addition cure silicone emulsion composition undergo little dehydrogenation during aging or in treating bath.

CITATION LIST

Patent Document 1: JP-B S57-53143
Patent Document 2: JP-A S54-52160
Patent Document 3: JP-A S63-314275
Patent Document 4: JP-A H06-57144
Patent Document 5: JP-A H11-222557
Patent Document 6: JP 3824072 (EP 1323796B1, U.S. Pat. No. 6,794,444)

DISCLOSURE OF INVENTION

An object of the invention is to provide an addition cure silicone emulsion composition which can form a cured film meeting both the requirements of light peel from PSA and good adhesion to plastic film substrate, and little degrades its capability during storage as finished product; and a release film using the composition.

The inventors have found that an addition cure silicone emulsion composition comprising a crosslinker component of specific structure and a specific surfactant component undergoes little dehydrogenation reaction during storage as finished product and exhibits good wettability to plastic film substrates, so that the silicone coating as cured is fully adherent to the plastic film substrate and lightly peelable from PSA. The invention is predicated on this finding.

In one aspect, the invention provides an addition cure silicone emulsion composition comprising (A) 10 to 40% by weight of a first organopolysiloxane having a viscosity of 5 to 100 mPa-s at 25° C., represented by the average compositional formula (1):

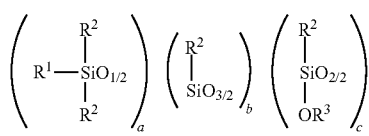

wherein $R^1$ is an alkenyl group of up to 8 carbon atoms, $R^2$ is each independently a substituted or unsubstituted monovalent hydrocarbon group of 1 to 10 carbon atoms and free of aliphatic unsaturation or an alkenyl group of up to 8 carbon atoms, $R^3$ is hydrogen or a substituted or unsubstituted monovalent hydrocarbon group of 1 to 10 carbon atoms, a, b and c are numbers in the range: $0.6 \leq (b+c)/a \leq 1.5$ and $0 \leq c/(b+c) \leq 0.05$, (B) 90 to 60% by weight of a second organopolysiloxane having a viscosity of 30 to 10,000 mPa-s at 25° C., represented by the average compositional formula (2):

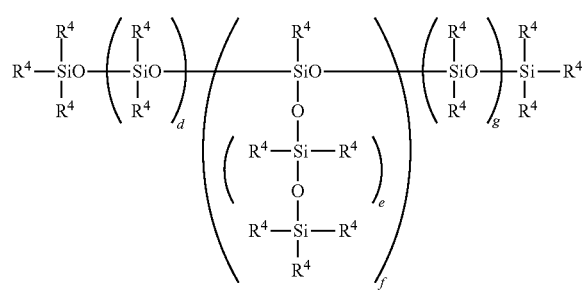

wherein $R^4$ is each independently a substituted or unsubstituted monovalent hydrocarbon group of 1 to 10 carbon atoms and free of aliphatic unsaturation or an alkenyl group of up to 8 carbon atoms, at least two $R^4$ being alkenyl, d, e, f and g are such positive numbers that the organopolysiloxane may have a viscosity of 30 to 10,000 mPa-s at 25° C., and $0 \leq f \leq 10$, the total of components (A) and (B) being 100% by weight, (C) an organohydrogenpolysiloxane having a viscosity of 5 to 200 mPa-s at 25° C., represented by the average compositional formula (3), the organohydrogenpolysiloxane containing at least three silicon-bonded hydrogen atoms (or SiH groups) per molecule and having a SiH group content of 0.80 to 1.25 mol/100 g, in such an amount that the molar ratio of SiH groups to all alkenyl groups in components (A) and (B), that is, SiH/alkenyl ratio may range from 1.0/1 to 3.0/1,

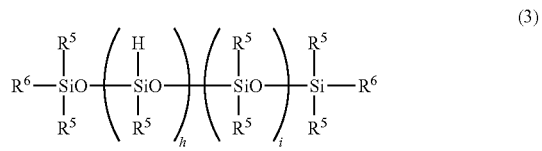

wherein $R^5$ is each independently a substituted or unsubstituted monovalent hydrocarbon group of 1 to 10 carbon atoms and free of aliphatic unsaturation, $R^6$ is hydrogen or a substituted or unsubstituted monovalent hydrocarbon group of 1 to 10 carbon atoms and free of aliphatic unsaturation, h and i are positive numbers in the range: $0 < h \leq 150$, $0 < i \leq 150$, and $0 < h+i \leq 200$, (D) a nonionic surfactant selected from polyoxyalkylene alkyl ethers, polyoxyalkylene phenyl ethers, and mixtures thereof, in an amount of 0.1 to 20 parts by weight per 100 parts by weight of components (A) to (C) combined, (E) water in an amount of 50 to 100,000 parts by weight per 100 parts by weight of components (A) to (C) combined, emulsion particles having a number average particle size of 200 to 600 nm as measured by the dynamic light scattering method.

In a typical embodiment, the silicone emulsion composition may further comprise (F) a catalytic amount of a platinum group metal based catalyst.

In a preferred embodiment, component (D) is at least one nonionic surfactant of the compositional formula:

$$R^7O(EO)_n(PO)_mH$$

wherein $R^7$ is a straight or branched alkyl group of 8 to 30 carbon atoms or a substituted or unsubstituted phenyl group, EO is ethylene oxide, PO is an alkylene oxide of at least 3 carbon atoms, EO and PO may be arranged in blocks or randomly, n and m each are a number of 0 to 100, and n+m>0. More preferably, component (D) is a nonionic surfactant selected from polyoxyethylene alkyl ethers, polyoxyethylene phenyl ethers and mixtures thereof. Even more preferably, component (D) is polyethylene tridecyl ether or polyoxyethylene styrenated phenyl ether.

If desired, a water-soluble resin may be added to the silicone emulsion composition.

In another aspect, the invention provides a release film comprising a plastic film and a coating thereon, the coating being formed by curing the addition cure silicone emulsion composition defined above.

Advantageous Effects of Invention

The silicone emulsion composition comprising a crosslinker component or organohydrogenpolysiloxane of specific structure and a specific surfactant component undergoes little dehydrogenation reaction during shelf storage and exhibits good wettability to any types of plastic film substrates. Its cured coating is fully adherent to the plastic film substrate and lightly peelable from various PSAs. The silicone emulsion composition is thus best suited for the release film application.

DESCRIPTION OF EMBODIMENTS

As used herein, the terms "first," "second," and the like do not denote any order or importance, but rather are used to distinguish one element from another. Also, the terms "the", "a" and "an" do not denote a limitation of quantity, but rather denote the presence of at least one of the referenced item. The acronym "PSA" stands for pressure-sensitive adhesive.

One embodiment of the invention is an addition cure silicone emulsion composition comprising components (A) to (E) as essential components wherein emulsion particles have a number average particle size of 200 to 600 nm as measured by the dynamic light scattering method.

Component A

Component (A) is a first organopolysiloxane having a viscosity of 5 to 100 mPa-s at 25° C. It is represented by the average compositional formula (1).

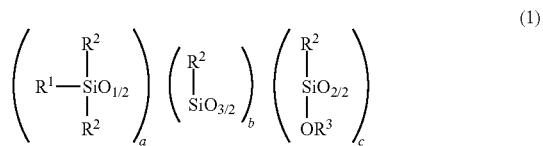

In formula (1), $R^1$ is an alkenyl group of up to 8 carbon atoms, such as vinyl, allyl, butenyl or pentenyl. $R^2$ which may be the same or different is a substituted or unsubstituted monovalent hydrocarbon group of 1 to 10 carbon atoms and free of aliphatic unsaturation or an alkenyl group of up to 8 carbon atoms. Suitable monovalent hydrocarbon groups of $R^2$ include alkyl groups such as methyl, ethyl, propyl, and butyl, cycloalkyl groups such as cyclohexyl, aryl groups such as phenyl and tolyl, and substituted forms of the foregoing in which some or all carbon-bonded hydrogen atoms are substituted by hydroxyl, cyano or halogen, such as hydroxypropyl, cyanoethyl, 1-chloropropyl and 3,3,3-trifluoropropyl, and suitable alkenyl groups include vinyl, allyl, butenyl and pentenyl. $R^3$ is hydrogen or a substituted or unsubstituted monovalent hydrocarbon group of 1 to 10 carbon atoms and free of aliphatic unsaturation. Suitable monovalent hydrocarbon groups of $R^3$ include alkyl groups such as methyl, ethyl, propyl, and butyl, cycloalkyl groups such as cyclohexyl, aryl groups such as phenyl and tolyl, and substituted forms of the foregoing in which some or all carbon-bonded hydrogen atoms are substituted by hydroxyl, cyano or halogen, such as hydroxypropyl, cyanoethyl, 1-chloropropyl and 3,3,3-trifluoropropyl. It is preferred from the industrial aspect that the alkenyl group in the first organopolysiloxane be vinyl.

The subscripts a, b and c are numbers in the range: $0.6 \leq (b+c)/a \leq 1.5$ and $0 \leq c/(b+c) \leq 0.05$. If $(b+c)/a$ is less than 0.6, the adhesion to plastic film which is one of the characteristic features of the invention is reduced. If $(b+c)/a$ exceeds 1.5, such higher proportions of $R^2SiO_{3/2}$ and $R^2(R^3O)SiO_{2/2}$ units make the synthesis of the first organopolysiloxane difficult. If $c/(b+c)$ exceeds 0.05, alkoxy or hydroxyl groups are so many that the silicone emulsion composition becomes less curable.

The first organopolysiloxane should have a viscosity of 5 to 100 mPa-s at 25° C. If the viscosity is less than 5 mPa-s, the silicone emulsion composition loses shelf stability. If the viscosity exceeds 100 mPa-s, the synthesis of the first organopolysiloxane is difficult. As used herein, the "viscosity" is measured by a rotational viscometer, and this is true throughout the disclosure.

As long as the benefits of the invention are not impaired, the first organopolysiloxane as component (A) may further comprise any mono, di and/or tetra-functional siloxane units free of alkenyl.

An appropriate proportion of component (A) is 10 to 40% by weight, more preferably 10 to 30% by weight based on the total of components (A) and (B), provided that the total is 100% by weight, in order that a cured silicone coating be fully adherent to plastic film substrate and lightly peelable from PSA. If the proportion of component (A) is less than 10% by weight, the adhesion to plastic film substrate becomes short. If the proportion of component (A) exceeds 40% by weight, the peel force relative to PSA is undesirably increased.

As used herein, the phrase "a cured silicone coating is lightly peelable from PSA" means that after a release film comprising a cured silicone coating formed on a plastic film substrate is tightly attached to a layer of PSA, the release film (or silicone coating) can be peeled from the PSA layer by a force smaller than the predetermined peel strength. For example, those release film samples requiring a peel force of less than 0.30 N/5 cm, especially 0.20 N/5 cm or less in the peel force test in Example described later are regarded "lightly peelable".

Component B

Component (B) is a second organopolysiloxane having a viscosity of 30 to 10,000 mPa-s at 25° C. It is represented by the average compositional formula (2).

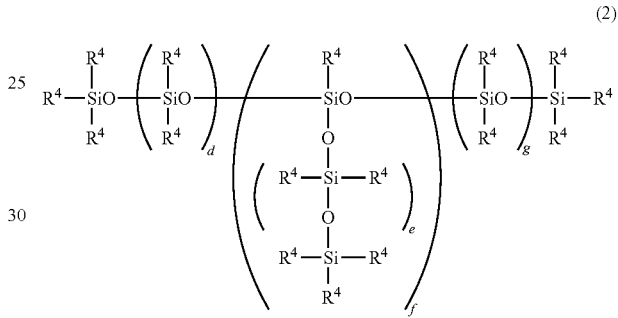

In formula (2), $R^4$ is a substituted or unsubstituted monovalent hydrocarbon group of 1 to 10 carbon atoms and free of aliphatic unsaturation or an alkenyl group of up to 8 carbon atoms. Suitable monovalent hydrocarbon groups of $R^4$ include alkyl groups such as methyl, ethyl, propyl, and butyl, cycloalkyl groups such as cyclohexyl, aryl groups such as phenyl and tolyl, and substituted forms of the foregoing in which some or all carbon-bonded hydrogen atoms are substituted by hydroxyl, cyano or halogen, such as hydroxypropyl, cyanoethyl, 1-chloropropyl and 3,3,3-trifluoropropyl, and suitable alkenyl groups include vinyl, allyl, butenyl and pentenyl. While $R^4$ may be the same or different, at least two $R^4$ are alkenyl.

The subscripts d, e, f and g are such positive numbers that the second organopolysiloxane may have a viscosity of 30 to 10,000 mPa-s at 25° C., and $0 \leq f \leq 10$. If f exceeds 10, gelation can occur during synthesis, making it difficult to obtain the second organopolysiloxane. The values of d, e and g are not particularly limited.

The second organopolysiloxane should have a viscosity of 30 to 10,000 mPa-s at 25° C. If the viscosity is less than 30 mPa-s, the silicone emulsion composition loses shelf stability. If the viscosity exceeds 10,000 mPa-s, a fully cured coating is not available.

Component (B) largely affects the peel force of a cured coating of the silicone emulsion composition relative to PSA. Thus the peel characteristics of a cured coating of the silicone emulsion composition can be controlled by changing the structure of the second organopolysiloxane and the substituent group thereon.

Component (B) need not be a single compound. Component (B) may be a mixture of plural organopolysiloxanes of different construction as long as the average of plural components satisfies the requirement of average compositional formula (2).

An appropriate proportion of component (B) is 60 to 90% by weight, more preferably 70 to 90% by weight based on the total of components (A) and (B), provided that the total is 100% by weight, in order that a cured silicone coating be fully adherent to plastic film substrate and lightly peelable from PSA.

Component C

Component (C) is an organohydrogenpolysiloxane having a viscosity of 5 to 200 mPa-s at 25° C. and containing at least three silicon-bonded hydrogen atoms (or SiH groups) per molecule, wherein the content of SiH groups is 0.80 to 1.25 mol/100 g of the organohydrogenpolysiloxane. It is represented by the average compositional formula (3).

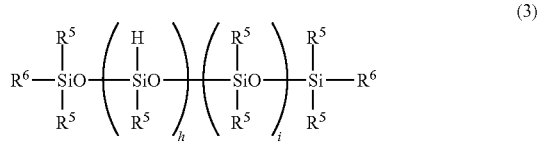

In formula (3), $R^5$ is a substituted or unsubstituted monovalent hydrocarbon group of 1 to 10 carbon atoms and free of aliphatic unsaturation. Suitable monovalent hydrocarbon groups of $R^5$ include alkyl groups such as methyl, ethyl, propyl, and butyl, cycloalkyl groups such as cyclohexyl, aryl groups such as phenyl and tolyl, and substituted forms of the foregoing in which some or all carbon-bonded hydrogen atoms are substituted by hydroxyl, cyano or halogen, such as hydroxypropyl, cyanoethyl, 1-chloropropyl and 3,3,3-trifluoropropyl. $R^6$ is hydrogen or a substituted or unsubstituted monovalent hydrocarbon group of 1 to 10 carbon atoms and free of aliphatic unsaturation. Suitable monovalent hydrocarbon groups of $R^6$ include alkyl groups such as methyl, ethyl, propyl, and butyl, cycloalkyl groups such as cyclohexyl, aryl groups such as phenyl and tolyl, and substituted forms of the foregoing in which some or all carbon-bonded hydrogen atoms are substituted by hydroxyl, cyano or halogen, such as hydroxypropyl, cyanoethyl, 1-chloropropyl and 3,3,3-trifluoropropyl.

The subscripts h and i are positive numbers in the range: $0<h\leq150$, $0<i\leq150$, and $0<h+i\leq200$, preferably $10\leq h\leq100$ and $10\leq i\leq100$.

The organohydrogenpolysiloxane should contain SiH groups in a content of 0.80 to 1.25 mol/100 g, preferably 1.00 to 1.20 mol/100 g. If the SiH content is less than 0.80 mol/100 g, the composition is unlikely to be fully curable. If the SiH content exceeds 1.25 mol/100 g, more dehydrogenation reaction of organohydrogenpolysiloxane takes place in the silicone emulsion composition, resulting in the composition having a shorter shelf life and less adhesion to plastic film substrates after shelf storage.

Component (C) is used in such an amount that the molar ratio of all SiH groups available from the organohydrogenpolysiloxane to all alkenyl groups available from components (A) and (B), that is, SiH/alkenyl ratio may range from 1.0/1 to 3.0/1, preferably from 1.2/1 to 2.0/1. If the SiH/alkenyl ratio is less than 1.0, curability is substantially impaired. If the SiH/alkenyl ratio exceeds 3.0, the peel force relative to PSA is substantially increased.

Component D

Component (D) is a nonionic surfactant or emulsifying agent selected from among polyoxyalkylene alkyl ethers, polyoxyalkylene phenyl ethers, and mixtures thereof.

The polyoxyalkylene alkyl ethers and polyoxyalkylene phenyl ethers have the compositional formula: $R^7O(EO)_n(PO)_mH$ wherein $R^7$ is a straight or branched $C_8$-$C_{30}$ alkyl group or a substituted or unsubstituted phenyl group, preferably a straight or branched $C_8$-$C_{12}$ alkyl group or a substituted or unsubstituted phenyl group, and more preferably a styrenated phenyl group which is a phenyl group whose hydrogen is substituted by a styryl group or $C_6H_5$—$CH(CH_3)$— group. EO is ethylene oxide, and PO is an alkylene oxide of at least 3 carbon atoms such as propylene oxide or butylene oxide. EO and PO may be arranged in blocks or randomly. The subscripts n and m each are a number of 0 to 100, preferably 0 to 50, and $n+m>0$.

In the compositional formula, it is preferred that $n>0$ and $m=0$. That is, component (D) is preferably at least one nonionic surfactant selected from polyoxyethylene alkyl ethers and polyoxyethylene phenyl ethers. More preferably, component (D) is polyethylene tridecyl ether or polyoxyethylene styrenated phenyl ether.

These nonionic surfactants may be used alone or in admixture of two or more. A single nonionic surfactant or a mixture of two or more nonionic surfactants desirably has a HLB (hydrophilic-lipophilic balance) value of 10 to 15.

The nonionic surfactant as component (D) is desirably used in a minimum amount sufficient to ensure that the resulting silicone emulsion composition is stable and wettable to plastic film substrates. Specifically the amount of component (D) used is 0.1 to 20 parts by weight, more preferably 0.5 to 15 parts by weight relative to 100 parts by weight of components (A), (B) and (C) combined. On this basis, emulsification may be difficult with less than 0.1 pbw of component (D) whereas a composition containing more than 20 pbw of component (D) becomes less curable.

A water-soluble resin may be used in combination with the nonionic surfactant (D) to facilitate emulsification and improve stability. A choice should be made of those resins having a minimum poisoning effect to the platinum group metal catalyst. A typical water-soluble resin is polyvinyl alcohol. Like the nonionic surfactant (D), the amount of the water-soluble resin used is desirably a minimum amount sufficient to ensure the stability and substrate wettability of the resulting silicone emulsion composition. Specifically, the amount of the water-soluble resin is 0.1 to 20 parts, preferably 1 to 10 parts by weight per 100 parts by weight of components (A), (B), and (C) combined.

Component E

Component (E) is water. Any water can be used herein as long as the impurity concentration of water is approximate to city water. However, it is recommended to avoid water having admixed therein a strong acid, strong base, or an amount of alcohol or salt because such water can detract from the stability of emulsion.

The amount of water used is determined so as to meet an appropriate viscosity for an applicator used in practice and the desired silicone coating weight on a substrate, and thus not particularly limited. The amount of water is 50 to 100,000 parts by weight, preferably 100 to 10,000 parts by weight per 100 parts by weight of components (A), (B) and (C) combined. Less than 50 pbw of water is difficult to form an oil-in-water (O/W) emulsion whereas more than 100,000 pbw of water detracts from stability.

Component F

Optionally, the silicone emulsion composition further comprises (F) a catalytic amount of a platinum group metal base catalyst. The catalyst (F) is to promote addition cure reaction in the composition and may be selected from well-known addition reaction catalysts. Exemplary catalysts include platinum, palladium and rhodium-based catalysts. Inter alia, platinum-based catalysts are preferred. Suitable platinum-based catalysts include chloroplatinic acid, alcohol or aldehyde solutions of chloroplatinic acid, and complexes of chloroplatinic acid with olefins or vinylsiloxanes.

The catalyst may be added in a catalytic amount. Preferably the catalyst is added in such an amount as to provide 1 to 1,000 ppm of platinum group metal based on the total weight of components (A), (B) and (C).

In addition to the foregoing components, any optional components may be added to the emulsion composition. For example, catalyst inhibitors such as organic nitrogen compounds, organic phosphorus compounds, acetylene derivatives, oxime compounds, and organic halides may be added for the purpose of inhibiting the catalytic activity of the platinum group metal-based catalyst; leveling agents such as silicone resins, silica, organopolysiloxanes free of silicon-bonded hydrogen or alkenyl group, and fluorochemical surfactants may be added for the purpose of controlling release properties; thickeners such as water-soluble polymers, e.g., methyl cellulose and polyvinyl alcohol may be added. These optional components may be added in commonly used amounts insofar as the benefits of the invention are not impaired.

The silicone emulsion composition of the invention may be prepared by any well-known techniques. One preferred procedure is by mixing amounts of components (A) to (D) with a portion of water (E) in a high-shear agitator such as a planetary mixer or combination mixer where emulsification is achieved by phase inversion, and adding the remainder of water (E) for dilution. For each component, a single compound or a mixture of two or more compounds may be used.

The silicone emulsion composition contains emulsion particles having a certain particle size. From the standpoints of plastic film substrate wettability and transparency of a cured coating, the number average particle size of emulsion particles as measured by the dynamic light scattering method should be in a range of 200 to 600 nm, preferably 300 to 500 nm. With the silicone emulsion composition as formulated herein, it is difficult to form emulsion particles having a number average particle size of less than 200 nm. If the number average particle size of emulsion particles exceeds 600 nm, they detract from the plastic film substrate wettability and transparency of a cured coating.

In the desirable procedure of preparing the silicone emulsion composition, the platinum group metal catalyst (F) is not added at the stage of emulsifying the other components. Once an emulsion is prepared from components (A) to (E), catalyst (F) is added to the emulsion immediately before use. It is also preferred that the platinum group metal catalyst be dispersed in water prior to addition. For example, the catalyst may be processed into an emulsion form by premixing with a surfactant or otherwise.

Once prepared, the silicone emulsion composition is coated onto a plastic film substrate in a wettable way and heat cured to form a release film consisting of the plastic film substrate and a cured coating which is fully adherent to the plastic film substrate and lightly peelable from PSA.

Examples of the plastic film substrate include polyolefin and polyester films such as biaxially oriented polypropylene film, polyethylene film, and ethylene-propylene copolymer film. The thickness of the plastic film substrate is typically 5 to 100 μm, though not critical.

In coating the silicone emulsion composition onto a plastic film substrate, any suitable applicator such as a gravure coater, air knife coater, roll coater or wire bar coater may be used. The coating weight is typically 0.1 to 2.0 g/m² as silicone solids, though not critical.

The plastic film substrate coated with the silicone emulsion composition is passed through a hot air circulating dryer, for example, where it is heated at 80 to 160° C. for 5 seconds to 3 minutes to form a cured silicone coating on the substrate, yielding a release film. The cured coating is tightly attached to the substrate and lightly peelable from PSA. The coating may also be cured by irradiation of infrared or ultraviolet radiation. The efficiency of cure may be enhanced by combining heat cure with IR or UV cure.

Typically the release film is attached to a layer of PSA. Examples of the PSA include well-known PSAs such as acrylic, urethane, rubber and silicone-based PSAs.

EXAMPLE

Examples of the invention are given below by way of illustration and not by way of limitation. All parts are by weight (pbw). The viscosity is measured at 25° C. by a rotational viscometer. The number average particle size of emulsion particles in a silicone emulsion composition is measured by Submicron Particle Seizer Coulter N4 Plus (Beckman Coulter) operating on the dynamic light scattering correlation principle.

Preparation of Emulsion Composition
Silicone Emulsion #1 (SE1)

A 5-L combined emulsifier comprising an anchor mixer capable of agitation throughout the vessel and a rotating disc having alternately upward and downward raised small teeth arranged along its circumference (T.K. CombiMix® Model M, Primix Corp.) was charged with 200 parts of organopolysiloxane (a) represented by the average compositional formula:

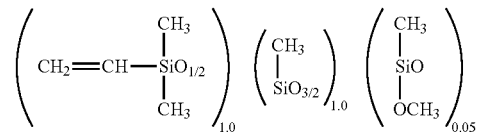

having a viscosity of 30 mPa-s and a vinyl content of 0.60 mol/100 g as first organopolysiloxane (A), 800 parts of a linear vinyl-terminated dimethylpolysiloxane (b-1) having a viscosity of 400 mPa-s and a vinyl content of 0.02 mol/100 g as second organopolysiloxane (B), 186 parts of a linear methylhydrogenpolysiloxane (c-1) with a SiH content of 1.20 mol/100 g and having SiH groups on side chain and a viscosity of 40 mPa-s as organohydrogenpolysiloxane (C), 12 parts (corresponding to 1.01 parts per 100 parts of components (A), (B) and (C) combined) of polyoxyethylene styrenated phenyl ether (d-1) having HLB 13.0 (Noigen® EA-137, Dai-Ichi Kogyo Seiyaku Co., Ltd.) as nonionic surfactant (D), 1,050 parts of 10 wt % polyvinyl alcohol aqueous solution as thickener, and 5 parts of ethynyl cyclohexanol as catalyst inhibitor. The ingredients were agitated and mixed until uniform. It is noted that the molar ratio of all SiH groups in component (C) to all alkenyl groups in components (A) and (B) is 1.64.

Next, 150 parts of water (specifically deionized water, hereinafter) was added to the mixture for phase inversion, followed by agitation for 30 minutes. The emulsion was transferred to a 15-L tank equipped with an agitator, where 9,462 parts of water was added to the emulsion as dilute water and agitated, yielding an O/W silicone emulsion composition #1 (SE1) having a silicone content of 10 wt % and a number average particle size of 470 nm. It is noted that in SE1, the amount of water (E) is 890 parts, provided that the total amount of components (A), (B) and (C) is 100 parts.

Silicone Emulsion #2 (SE2)

As in the preparation of SE1, a combined emulsifier was charged with 200 parts of organopolysiloxane (a) (same as in SE1) as component (A), 800 parts of vinyl-terminated dimethylpolysiloxane (b-1) (same as in SE1) as component (B), 205 parts of a linear methylhydrogenpolysiloxane (c-2) with a SiH content of 1.10 mol/100 g and having SiH groups on side chain and a viscosity of 140 mPa·s as component (C), 12 parts (corresponding to 1.00 part per 100 parts of components (A), (B) and (C) combined) of polyoxyethylene styrenated phenyl ether (d-1) having HLB 13.0 (Noigen® EA-137, Dai-Ichi Kogyo Seiyaku Co., Ltd.) as component (D), 1,050 parts of 10 wt % polyvinyl alcohol aqueous solution as thickener, and 5 parts of ethynyl cyclohexanol as catalyst inhibitor. The ingredients were agitated and mixed until uniform. It is noted that the molar ratio of all SiH groups in component (C) to all alkenyl groups in components (A) and (B) is 1.66.

Next, 150 parts of water was added to the mixture for phase inversion, followed by agitation for 30 minutes. The emulsion was transferred to a 15-L tank equipped with an agitator, where 9,628 parts of water was added to the emulsion as dilute water and agitated, yielding an O/W silicone emulsion composition #2 (SE2) having a silicone content of 10 wt % and a number average particle size of 450 nm. It is noted that in SE2, the amount of water (E) is 890 parts, provided that the total amount of components (A), (B) and (C) is 100 parts.

Silicone Emulsion #3 (SE3)

As in the preparation of SE1, a combined emulsifier was charged with 200 parts of organopolysiloxane (a) (same as in SE1) as component (A), 800 parts of vinyl-terminated dimethylpolysiloxane (b-1) (same as in SE1) as component (B), 186 parts of linear methylhydrogenpolysiloxane (c-1) with a SiH content of 1.20 mol/100 g and having SiH groups on side chain and a viscosity of 40 mPa·s as component (C), 12 parts (corresponding to 1.01 parts per 100 parts of components (A), (B) and (C) combined) of polyoxyethylene tridecyl ether (d-2) having HLB 13.0 (Leocol® TDN90-80, Lion Corp.) as component (D), 1,050 parts of 10 wt % polyvinyl alcohol aqueous solution as thickener, and 5 parts of ethynyl cyclohexanol as catalyst inhibitor. The ingredients were agitated and mixed until uniform. It is noted that the molar ratio of all SiH groups in component (C) to all alkenyl groups in components (A) and (B) is 1.64.

Next, 150 parts of water was added to the mixture for phase inversion, followed by agitation for 30 minutes. The emulsion was transferred to a 15-L tank equipped with an agitator, where 9,462 parts of water was added to the emulsion as dilute water and agitated, yielding an O/W silicone emulsion composition #3 (SE3) having a silicone content of 10 wt % and a number average particle size of 500 nm. It is noted that in SE3, the amount of water (E) is 890 parts, provided that the total amount of components (A), (B) and (C) is 100 parts.

Silicone Emulsion #4 (SE4)

As in the preparation of SE1, a combined emulsifier was charged with 200 parts of organopolysiloxane (a) (same as in SE1) as component (A), 800 parts of a branched vinyl-terminated (non-terminal vinyl free) dimethylpolysiloxane (b-2) having a viscosity of 250 mPa·s and a vinyl content of 0.028 mol/100 g as component (B), 197 parts of linear methylhydrogenpolysiloxane (c-1) with a SiH content of 1.20 mol/100 g and having SiH groups on side chain and a viscosity of 40 mPa·s as component (C), 12 parts (corresponding to 1.00 part per 100 parts of components (A), (B) and (C) combined) of polyoxyethylene styrenated phenyl ether (d-1) having HLB 13.0 (Noigen® EA-137, Dai-Ichi Kogyo Seiyaku Co., Ltd.) as component (D), 1,050 parts of 10 wt % polyvinyl alcohol aqueous solution as thickener, and 5 parts of ethynyl cyclohexanol as catalyst inhibitor. The ingredients were agitated and mixed until uniform. It is noted that the molar ratio of all SiH groups in component (C) to all alkenyl groups in components (A) and (B) is 1.64.

Next, 150 parts of water was added to the mixture for phase inversion, followed by agitation for 30 minutes. The emulsion was transferred to a 15-L tank equipped with an agitator, where 9,556 parts of water was added to the emulsion as dilute water and agitated, yielding an O/W silicone emulsion composition #4 (SE4) having a silicone content of 10 wt % and a number average particle size of 450 nm. It is noted that in SE4, the amount of water (E) is 890 parts, provided that the total amount of components (A), (B) and (C) is 100 parts.

Silicone Emulsion #5 (SE5)

As in the preparation of SE1, a combined emulsifier was charged with 200 parts of organopolysiloxane (a) (same as in SE1) as component (A), 800 parts of vinyl-terminated dimethylpolysiloxane (b-1) (same as in SE1) as component (B), 140 parts of a linear methylhydrogenpolysiloxane (c-3) with a SiH content of 1.60 mol/100 g and having SiH groups on side chain and a viscosity of 20 mPa·s as component (C), 11 parts (corresponding to 0.93 part per 100 parts of components (A), (B) and (C) combined) of polyoxyethylene styrenated phenyl ether (d-1) having HLB 13.0 (Noigen® EA-137, Dai-Ichi Kogyo Seiyaku Co., Ltd.) as component (D), 1,050 parts of 10 wt % polyvinyl alcohol aqueous solution as thickener, and 5 parts of ethynyl cyclohexanol as catalyst inhibitor. The ingredients were agitated and mixed until uniform. It is noted that the molar ratio of all SiH groups in component (C) to all alkenyl groups in components (A) and (B) is 1.65.

Next, 150 parts of water was added to the mixture for phase inversion, followed by agitation for 30 minutes. The emulsion was transferred to a 15-L tank equipped with an agitator, where 9,026 parts of water was added to the emulsion as dilute water and agitated, yielding an O/W silicone emulsion composition #5 (SE5) having a silicone content of 10 wt % and a number average particle size of 450 nm. It is noted that in SE5, the amount of water (E) is 888 parts, provided that the total amount of components (A), (B) and (C) is 100 parts.

Silicone Emulsion #6 (SE6)

As in the preparation of SE1, a combined emulsifier was charged with 200 parts of organopolysiloxane (a) (same as in SE1) as component (A), 800 parts of vinyl-terminated dimethylpolysiloxane (b-1) (same as in SE1) as component (B), 308 parts of a linear methylhydrogenpolysiloxane (c-4) with a SiH content of 0.72 mol/100 g and having SiH groups on side chain and a viscosity of 130 mPa·s as component (C), 11 parts (corresponding to 0.84 part per 100 parts of components (A), (B) and (C) combined) of polyoxyethylene styrenated phenyl ether (d-1) having HLB 13.0 (Noigen® EA-137, Dai-Ichi Kogyo Seiyaku Co., Ltd.) as component (D), 1,050 parts of 10 wt % polyvinyl alcohol aqueous solution as thickener, and 5 parts of ethynyl cyclohexanol as catalyst inhibitor. The ingredients were agitated and mixed until uniform. It is noted that the molar ratio of all SiH groups in component (C) to all alkenyl groups in components (A) and (B) is 1.63.

Next, 150 parts of water was added to the mixture for phase inversion, followed by agitation for 30 minutes. The emulsion was transferred to a 15-L tank equipped with an agitator, where 10,556 parts of water was added to the emulsion as dilute water and agitated, yielding an O/W silicone emulsion composition #6 (SE6) having a silicone content of 10 wt % and a number average particle size of 480 nm. It is noted that in SE6, the amount of water (E) is 891 parts, provided that the total amount of components (A), (B) and (C) is 100 parts.

Silicone Emulsion #7 (SE7)

As in the preparation of SE1, a combined emulsifier was charged with 200 parts of organopolysiloxane (a) (same as in SE1) as component (A), 800 parts of vinyl-terminated dimethylpolysiloxane (b-1) (same as in SE1) as component (B), 186 parts of linear methylhydrogenpolysiloxane (c-1) with a SiH content of 1.20 mol/100 g and having SiH groups on side chain and a viscosity of 40 mPa-s as component (C), 12 parts (corresponding to 1.01 parts per 100 parts of components (A), (B) and (C) combined) of polyoxyalkylene alkenyl ether (d-3) having HLB 12.6 (Latemul® PD-420, Kao Co., Ltd.) as component (D), 1,050 parts of 10 wt % polyvinyl alcohol aqueous solution as thickener, and 5 parts of ethynyl cyclohexanol as catalyst inhibitor. The ingredients were agitated and mixed until uniform. It is noted that the molar ratio of all SiH groups in component (C) to all alkenyl groups in components (A) and (B) is 1.65.

Next, 150 parts of water was added to the mixture for phase inversion, followed by agitation for 30 minutes. The emulsion was transferred to a 15-L tank equipped with an agitator, where 9,462 parts of water was added to the emulsion as dilute water and agitated, yielding an O/W silicone emulsion composition #7 (SE7) having a silicone content of 10 wt % and a number average particle size of 700 nm. It is noted that in SE7, the amount of water (E) is 890 parts, provided that the total amount of components (A), (B) and (C) is 100 parts.

The silicone emulsion compositions #1 to #7 (SE1 to SE7) are tabulated in Table 1.

Comparative Examples 1 to 3

Sample silicone emulsion compositions were prepared by the same procedure as in Example 1 aside from using SE5, SE6 and SE7 instead of SE1.

These sample silicone emulsion compositions of Examples and Comparative Examples were evaluated for wettability to film substrate, adhesion, and peel force relative to PSA by the following tests.

Tests (1) Wettability

A sample silicone emulsion composition immediately after preparation was applied onto a PET film substrate of 38 thick in such a coverage as to give a coating weight of 0.3 g/m$^2$ of silicone solids after curing. The coated substrate was allowed to stand for 30 seconds, after which wettability was evaluated by observing whether or not the silicone emulsion composition coating was repelled by the PET film. In terms of wettability, the sample was rated good (○) when the coating was little repelled at the center of the substrate, mediocre (Δ) when some portions of coating were repelled, and poor (X) when many portions of coating were repelled.

(2) Initial Adhesion

A sample silicone emulsion composition immediately after preparation was applied onto a PET film substrate of 38 μm thick and heated in a hot air circulating dryer at 120° C. for 30 seconds to form a cured coating having a coating weight of 0.3 g/m$^2$ of silicone solids. After holding for one day at room temperature, the surface of the cured coating was rubbed several strokes with the finger. Initial adhesion was evaluated by visually observing whether the coating became hazy and rubbed off. In terms of adhesion, the sample was rated good (○) when the coating did not haze or rub off, mediocre (Δ) when the coating became hazy to some extent, and poor (X) when the coating rubbed off.

TABLE 1

| Component | Amount | SE1 | SE2 | SE3 | SE4 | SE5 | SE6 | SE7 |
|---|---|---|---|---|---|---|---|---|
| A) First organopolysiloxane | pbw | 200 | 200 | 200 | 200 | 200 | 200 | 200 |
| B) Second organopolysiloxane | pbw | 800 | 800 | 800 | 800 | 800 | 800 | 800 |
| C) Organohydrogenpolysiloxane | pbw | 186 | 205 | 186 | 197 | 140 | 308 | 186 |
| SiH content | mol/100 g | 1.20 | 1.10 | 1.20 | 1.20 | 1.60 | 0.72 | 1.20 |
| SiH/alkenyl | molar ratio* | 1.64 | 1.66 | 1.64 | 1.64 | 1.65 | 1.63 | 1.65 |
| D) Surfactant | pbw** | 1.01 | 1.00 | 1.01 | 1.00 | 0.93 | 0.84 | 1.01 |
| E) Water | pbw** | 890 | 890 | 890 | 890 | 888 | 891 | 890 |
| Number average particle size of emulsion particles (nm) | | 470 | 450 | 500 | 450 | 450 | 480 | 700 |

*Molar ratio of SiH groups in component (C) to total alkenyl groups in components (A) and (B)
**Amount (parts) of water per 100 parts of components (A), (B) and (C) combined

Example 1

To 100 parts of silicone emulsion composition #1 (SE1) was added 1.5 parts of a platinum catalyst emulsion CAT-PM-10A (Shin-Etsu Chemical Co., Ltd.) as component (F). They were thoroughly mixed to form a sample silicone emulsion composition.

Examples 2 to 4

Sample silicone emulsion compositions were prepared by the same procedure as in Example 1 aside from using SE2, SE3 and SE4 instead of SE1.

(3) Aged Adhesion

The silicone emulsion composition prior to the addition of catalyst (F) was aged at 40° C. for one month. The catalyst was added to the aged composition to form a sample silicone emulsion composition (as in Example 1). The sample silicone composition immediately after preparation was applied onto a PET film substrate of 38 μm thick and heated in a hot air circulating dryer at 120° C. for 30 seconds to form a cured coating having a coating weight of 0.3 g/m$^2$ of silicone solids. After holding for one day at room temperature, the surface of the cured coating was rubbed several strokes with the finger. Aged adhesion was evaluated by visually observing whether the coating became hazy and rubbed off. In terms of adhesion, the sample was rated good (○) when the coating did not haze or rub off, mediocre when the coating became hazy to some extent, and poor (X) when the coating rubbed off.

The sample which is good in the initial adhesion test, but poor (rub-off) in the aged adhesion test indicates that the amount of SiH groups in the silicone emulsion composition is reduced via dehydrogenation during aging.

(4) Peel Force

A sample silicone emulsion composition immediately after preparation was applied onto a PET film substrate and heated at 120° C. for 30 seconds to form a cured coating as in the initial adhesion test. An acrylic pressure-sensitive adhesive BPS-5127 (Toyo Ink Co., Ltd.) was applied to the cured coating and heated at 100° C. for 3 minutes. Another PET film was attached to the treated surface. The sample was cut into a strip of 5 cm wide and aged at room temperature for one day. Using a tensile tester, the force (N/5 cm) required to peel the overlying PET film at an angle of 180° and a pull rate of 0.3 m/min was measured as peel force. A sample requiring a peel force of 0.30 N/5 cm or more is rated poor.

The results of these tests are tabulated in Table 2.

TABLE 2

| Test item | Example | | | | Comparative Example | | |
|---|---|---|---|---|---|---|---|
| | 1 SE1 | 2 SE2 | 3 SE3 | 4 SE4 | 1 SE5 | 2 SE6 | 3 SE7 |
| Wettability | ○ | ○ | ○ | ○ | ○ | ○ | X |
| Initial adhesion | ○ | ○ | ○ | ○ | ○ | X | X |
| Aged adhesion | ○ | ○ | ○ | ○ | X | X | X |
| Peel force (N/5 cm) | 0.18 | 0.18 | 0.18 | 0.20 | 0.18 | 0.16 | 0.30 |

In Examples 1 to 4, the silicone emulsion compositions showed good wettability, initial adhesion and aged adhesion relative to the film substrate, and allowed for peeling by a small force of 0.20 N/5 cm or less relative to the PSA.

Comparative Example 1 in which the SiH content in component (C) is greater than the range of the invention was poor in aged adhesion. In Comparative Example 2 in which the SiH content in component (C) is lower than the range of the invention, the silicone coating was under-cured, and initial adhesion and aged adhesion were poor. Comparative Example 3 in which a surfactant of different type from that defined in the invention is used and the number average particle size of emulsion particles is greater than the range of the invention showed poor wettability to film substrate and failed in initial adhesion and aged adhesion.

While the invention has been illustrated and described in typical embodiments, it is not intended to be limited to the details shown. Any modified embodiments having substantially the same features and achieving substantially the same results as the technical idea disclosed herein are within the spirit and scope of the invention.

Japanese Patent Application No. 2012-129935 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An addition cure silicone emulsion composition comprising
   (A) 10 to 40% by weight of a first organopolysiloxane having a viscosity of 5 to 100 mPa-s at 25° C., represented by the average compositional formula (1):

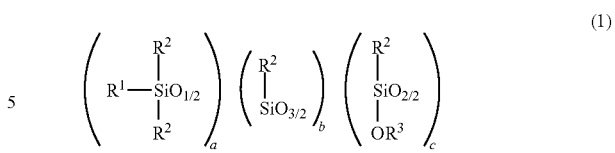

wherein $R^1$ is an alkenyl group of up to 8 carbon atoms, $R^2$ is each independently a substituted or unsubstituted monovalent hydrocarbon group of 1 to 10 carbon atoms and free of aliphatic unsaturation or an alkenyl group of up to 8 carbon atoms, $R^3$ is hydrogen or a substituted or unsubstituted monovalent hydrocarbon group of 1 to 10 carbon atoms, a, b and c are numbers in the range: $0.6 \leq (b+c)/a \leq 1.5$ and $0 \leq c/(b+c) \leq 0.05$, (B) 90 to 60% by weight of a second organopolysiloxane having a viscosity of 30 to 10,000 mPa-s at 25° C., represented by the average compositional formula (2):

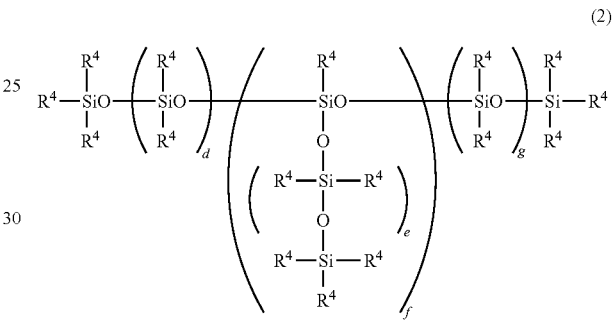

wherein $R^4$ is each independently a substituted or unsubstituted monovalent hydrocarbon group of 1 to 10 carbon atoms and free of aliphatic unsaturation or an alkenyl group of up to 8 carbon atoms, at least two $R^4$ being alkenyl, d, e, f and g are such positive numbers that the organopolysiloxane may have a viscosity of 30 to 10,000 mPa-s at 25° C., and $0 \leq f \leq 10$, the total of components (A) and (B) being 100% by weight, (C) an organohydrogenpolysiloxane having a viscosity of 5 to 200 mPa-s at 25° C., represented by the average compositional formula (3), the organohydrogenpolysiloxane containing at least three silicon-bonded hydrogen atoms (or SiH groups) per molecule and having a SiH group content of 0.80 to 1.25 mol/100 g, in such an amount that the molar ratio of SiH groups to all alkenyl groups in components (A) and (B) may range from 1.0/1 to 3.0/1,

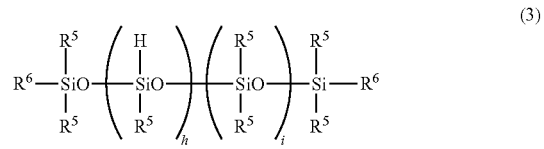

wherein $R^5$ is each independently a substituted or unsubstituted monovalent hydrocarbon group of 1 to 10 carbon atoms and free of aliphatic unsaturation, $R^6$ is hydrogen or a substituted or unsubstituted monovalent hydrocarbon group of 1 to 10 carbon atoms and free of aliphatic unsaturation, h and i are positive numbers in the range: $0 < h \leq 150$, $0 < i \leq 150$, and $0 < h+i \leq 200$, (D) a nonionic surfactant selected from polyoxyalkylene alkyl ethers, polyoxyalkylene phenyl ethers, and mixtures thereof, in an amount of 0.1 to 20 parts by weight per 100 parts by weight of components (A) to (C) combined, (E) water in an amount of 50 to 100,000 parts by weight per 100 parts by weight of components (A) to (C) combined, emulsion particles having a number average particle size of 200 to 600 nm as measured by the dynamic light scattering method.

2. The silicone emulsion composition of claim 1, further comprising (F) a catalytic amount of a platinum group metal based catalyst.

3. The silicone emulsion composition of claim 1 wherein component (D) is a nonionic surfactant of the compositional formula:

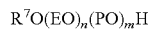

$R^7O(EO)_n(PO)_mH$ wherein $R^7$ is a straight or branched alkyl group of 8 to 30 carbon atoms or a substituted or unsubstituted phenyl group, EO is ethylene oxide, PO is an alkylene oxide of at least 3 carbon atoms, EO and PO may be arranged in blocks or randomly, n and m each are a number of 0 to 100, and n+m>0.

4. The silicone emulsion composition of claim 3 wherein component (D) is a nonionic surfactant selected from polyoxyethylene alkyl ethers, polyoxyethylene phenyl ethers and mixtures thereof.

5. The silicone emulsion composition of claim 4 wherein component (D) is polyethylene tridecyl ether or polyoxyethylene styrenated phenyl ether.

6. The silicone emulsion composition of claim 1, further comprising a water-soluble resin.

7. A release film comprising a plastic film and a coating thereon, the coating being formed by curing the addition cure silicone emulsion composition of any one of claims 1 to 6.

* * * * *